Patented Feb. 8, 1949

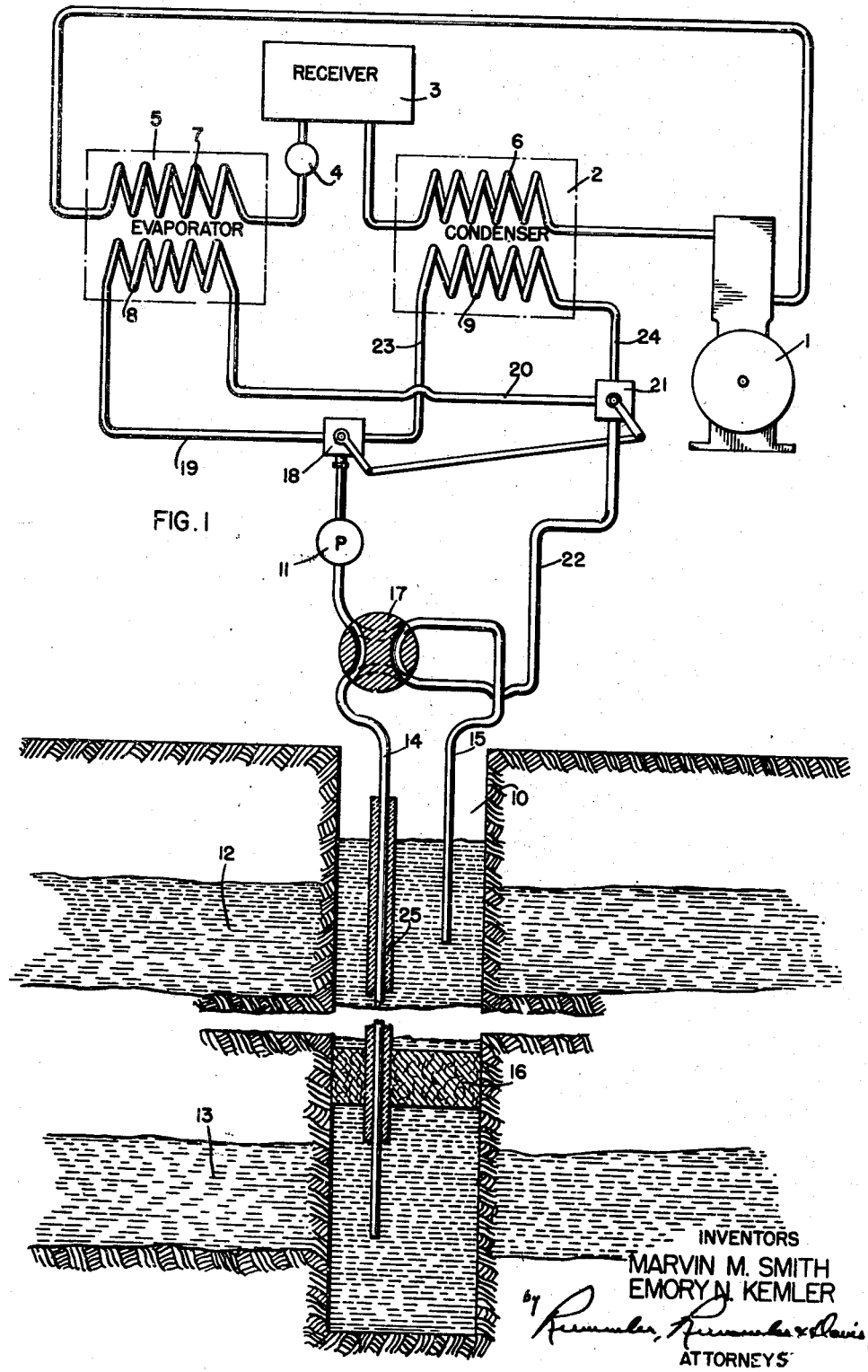

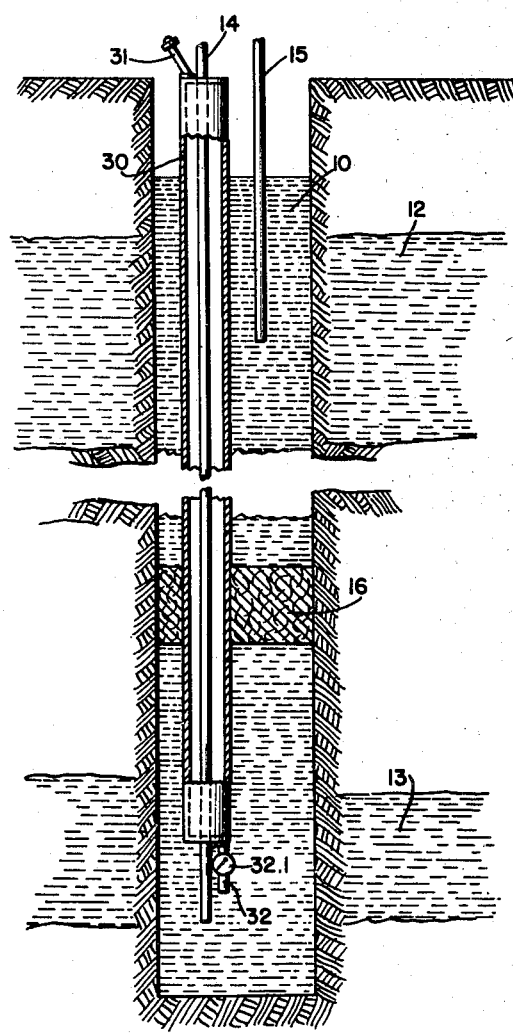
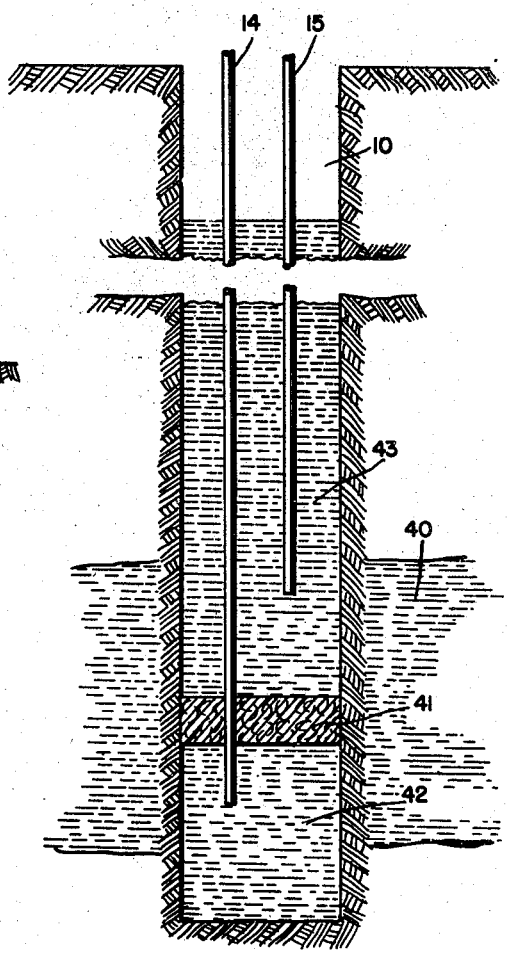

2,461,449

UNITED STATES PATENT OFFICE 2,461,449

HEAT PUMP USING DEEP WELL FOR A HEAT SOURCE

Marvin M. Smith, Muncie, Ind., and Emory N. Kemler, Birmingham, Ala., assignors to Muncie Gear Works, Inc., Muncie, Ind., a corporation of Indiana Application October 14, 1946, Serial No. 703,264

7 Claims. (Cl. 62—129)

This invention relates to method and means for utilizing subterranean water sources as a source of heat, and for the dissipation of heat, in the operation of heat pumps for heating and cooling purposes.

More particularly this invention concerns improvements in the construction and utilization of deep wells for the operation of reversible cycle refrigeration or heat pump apparatus, such as that disclosed in the copending application of Emory N. Kemler, Serial No. 672,924, filed May 29, 1946, now Patent No. 2,432,316, granted Dec. 9, 1947, and is a further development of the invention disclosed in the copending application of Marvin M. Smith, Serial No. 624,351 filed October 25, 1945.

The main objects of this invention are to provide an improved method of transferring heat to and from subterranean sources for the operation of heat pump apparatus; to provide an improved method of obtaining heat from underground water sources; to provide an improved method for dissipating heat from heat pump apparatus to underground water sources; to provide an improved deep well arrangement for more efficiently utilizing subterranean water sources to obtain heat for, and to dissipate heat from, reversible cycle heat pump apparatus; to provide an improved deep well construction wherein different levels of subterranean water courses, intersected by the deep well, may be separated from each other; to provide an improved deep well arrangement wherein subterranean water sources of different temperatures are prevented from intermingling; and to provide an improved deep well arrangement whereby heat loss from a water source of a high temperature level to a water source of a lower temperature level is minimized.

Specific embodiments of this invention are shown in the accompanying drawings wherein:

Figure 1 is a view showing an improved deep well construction together with a diagrammatically represented heat pump apparatus arranged to utilize the well water both as a source of heat and as a means for dissipation of heat.

Fig. 2 is a view showing a modified arrangement of a deep well for minimizing heat loss from a lower warmer water source to the upper cooler water source, and Fig. 3 is a view showing another arrangement of a deep well for more efficiently utilizing a single water source as a source of heat for heat pump apparatus and as a means for dissipating heat from heat pump apparatus.

Since the development of heat pump apparatus for heating and cooling operations, aside from mere refrigeration, it has been realized that earth heat may be utilized as a source of energy in connection with heat pump operation on the heat cycle and that likewise the earth may be used as a place to dispose of heat when the heat pump is operating on the cooling cycle. Subterranean water as obtained from wells has been used for this purpose, however, in many cases serious limitations arise through the dissipation of water obtained from the wells, with the resultant depletion of the ground water content and a serious lowering of the ground water level.

To overcome these objections, the present invention employs a deep well of comparatively great depth to obtain maximum benefit of heat transfer from earth to water; and the arrangement is such that water removed from the earth is returned to the well to maintain the subterranean water balance, and under an average annual operation, to maintain a normal earth heat balance.

A simplified heat pump system utilizing earth heat as a source of low level energy which is converted to a higher level energy through the use of the refrigeration cycle, and which is reversible to utilize the earth as a means for dissipating heat when operating on a cooling cycle is diagrammatically shown in Fig. 1, wherein the use of the earth temperature is obtained by means of a deep well which intersects at least two levels of subterranean water sources.

The heat pump apparatus of Fig. 1 comprises a compressor 1, a condenser 2, receiver 3, expansion valve 4, and an evaporator 5 which are connected in series for the passage and utilization of a suitable refrigerant in the usual and well known manner. The refrigerant is circulated from the compressor through a suitable condenser-heat interchanger 6 and thence through the receiver and expansion valve to the evaporator-heat-interchanger 7, from where the refrigerant is returned to the compressor 1.

When operating on the heating cycle, the medium to be heated is passed through the condenser 2 where it picks up heat from the interchanger 6; and heat is supplied to the system by means of a suitable conductor 8 arranged to transfer heat to the evaporator-interchanger 7.

When operating on the cooling cycle, the medium to be cooled is passed through the evaporator 5 where its heat is absorbed by the interchanger 7; and the heat is removed from the system by means of a suitable conductor 9 arranged to pick up or receive heat from the condenser-heat-interchanger 6.

In either case, the present invention contemplates that the heat pump apparatus will use well water either as a source of heat to the evaporator 5 when the system is operating on the heating cycle, or as a means of removing heat from the system through the condenser 2 when the apparatus is operating on the cooling cycle. Such water is obtained from the deep well 10 by means of a pump 11, which, through suitable valves and piping circulates the well water through either the conductor 8 or the conductor 9 as may be desired.

It is known that water obtained from the deepest sources will probably or usually have the highest temperatures, therefore, we usually use a well of considerable depth, preferably two hundred to three hundred feet, as may be practicable, taking water from the bottom portion of the well as a heat source and returning such water to the upper portion of the well, or taking water from the upper portion of the well when the water is to be used for cooling and returning such water to the lower part of the well.

Such a well may intersect two or more separate strata of underground water source. In practically every area these water sources will be of different pressures and different temperatures, and it is probable that within the well there would be circulation between the water strata with the result that a water source at one level may be dissipated to some other level, because of pressure differences, causing a lowering of the maximum temperatures that might otherwise be obtained.

In order to obviate some of these difficulties, we arranged to separate the several water sources by means of a packer located in the well at a suitable point between the intersected water levels.

As shown in Fig. 1, the well 10 is of such depth as to pass through an upper water level 12 and a lower water level 13 which are normally independent of each other except for such cross circulation as may result from the permeability of the earth structures through which they run. Two legs of piping are provided, one leg 14 extending to the lower portion of the well and the other leg 15 terminating in the upper portion of the well and a suitable packer 16 run on the piping leg 14 is set at a location or a level in the well that is between the water sources 12 and 13, the packer 16 being so installed as to block any circulation between the upper and lower well portions so that communication between the water source levels 12 and 13 within the well will be had solely through the piping 14 and 15.

With such an arrangement, water for use as a heat source will be taken from the lower portion of the well, supplied by the water course 13, by means of the pipe or tube 14 which leads to the pump 11 through a four-way valve 17, and thence through a three-way valve 18 to the pipe 19 which leads to one end of the conductor or heat exchanger 8. From the conductor 8, the water is returned by means of pipe 20 to a three-way valve 21 and thence through the pipe 22 to the four-way valve 17 where it leads to the pipe 15 to be emptied into the upper portion of the well 10 supplied by the water course 12. Thus water from the warmest part of the well is supplied to the evaporator where the low level heat energy of the water is removed, and the cooled water is returned to the upper or cooler portion of the well 10.

During the cooling operation or cycle of the heat pump, the water circuit from the well is reversed by means of the four-way valve 17 so that the flow is from the upper part of the well through the pipe 15, the four-way valve 17 to the pump 11. Also the water circuit through the heat pump apparatus is switched from the evaporator 5 to the condenser 2, by means of the three-way valves 18 and 21, so that the circuit from the pump 11 runs through the three-way valve 18 and the supply pipe 23 to the conductor or heat exchanger 9, and thence through the return pipe 24, the three-way valve 21, the pipe 22 and the four-way valve 17 to the pipe 14 through which the water, heated in the condenser trough transfer of heat from the interchanger 6 to the conductor 9, is discharged to the lower part of the well 10 supplied by the water course 13.

In either the heating or the cooling cycle it is desirable that there be no heat transfer from the warm water running through the circuit to the relatively cooler water in the upper portion of the well and, to minimize the possibility of such heat transfer, the long leg 14 of the well piping is provided with a suitable insulation 25 on that portion of the pipe 14 which passes through the upper part of the well 10 to the lower side of the packer 16.

Thus the improved well on both the heating and cooling cycles maintains the maximum overall efficiency of the system, prevents uncontrolled mixing of the different water levels and, through reversing of the water flow through the piping, averages out the loss of water from one level to another thereby maintaining, in the course of an annual period of operation, a minimum loss of water supply.

The modified arrangement of our improved well illustrated in Fig. 2 is directed particularly to a specific means for insulating the long leg 14 of the well water circuit which extends through the upper or cooler water stratum 12 and into the lower or warmer stratum 13. A packer 16 is run on the long leg 14 of the well water circuit, as in the case of the arrangement shown in Fig. 1 to separate the upper water stratum 12 and the lower water stratum 13 and thus prevent contamination of one water course by the other.

As shown in Fig. 2, the improved insulating means for the long leg 14 of the well water circuit comprises a casing 30 which is of larger diameter than the pipe or conduit 14 and which is run on the conduit 14 so as to provide a surrounding air space between the conduit 14 and the inner wall of the casing 30. The casing 30 is preferably of such length as to extend from the top of the well through the packer 16 and into the water of the lower water course 13. The casing 30 is also closed at each end by a flange or cap or other suitable means which in turn is secured onto the conduit 14 as by welding or any other suitable manner.

As shown in Fig. 2, an air connection 31, accessible from the top of the well, is provided on the upper casing closure which air connection leads to the interior of the casing 30 and serves as a means of introducing air under pressure into the casing 30 so as to force out any water that might enter or collect in the casing 30. It will be understood that the air connection 31 is provided with a suitable air valve arranged to prevent loss of the air that is introduced into the casing 30.

The lower end of the casing 30 is provided with an outlet 32 by means of which water contained in the casing may be forced therefrom, the outlet 32 being provided with a suitable check valve 32.1 to prevent entry of the well water into the casing and to minimize absorption of the air by the well water at the lower end of the casing.

Thus it will be seen that air under pressure forced into the casing 30 by means of the air connection 31 will serve to expell any water from the casing and will become a dead air space insulating medium to prevent transfer of heat from or to the long leg 14 of the well water conduit or circuit.

In order to determine that the casing 30 is completely filled with air, a pressure gauge, not shown, may be mounted on the air connection and air may then be forced into the casing 30 through the air connection 31 until the pressure gauge reaches a point of equilibrium or such that no increase of pressure is noted. This will thus indicate that air is being forced through the check valve 32.1, located in the outlet 32 at the lower end of the casing, and that all water has been expelled.

Another modification of our improved well construction is shown in Fig. 3, this arrangement being one that may be employed in cases where the deep well 10 extends into a water stratum 40 of considerable depth. In this case the packer 41 which is run on the long leg 14 of the well water circuit is located at a point near the middle of the water stratum 40 so as to divide the water in the well into two sections. The long leg 14 of the well water circuit will extend through the packer 41 and into the lower well section 42 and the short leg 15 of the water circuit will terminate at a point near the bottom of the upper well section 43.

This latter well arrangement is particularly suitable where the water supply is obtained from a well having a relatively large bore section of several feet and water may be taken from the upper part or section 43 of the well and returned to the lower part 42 or vice versa, as desired.

Such an arrangement is entirely feasible since, due to the nature of the porous earth media through which water is transmitted, the vertical permeability to water flow is usually less than the horizontal permeability.

Thus any large immediate flow of water from the upper level to the lower level is prevented. However, at a considerable distance from the well, the lack of vertical permeability will tend to even out and the average pressure in the water producing stratum 40 will be equalized. The net effect of this arrangement is therefore to conserve completely the water supply and pressure, and to give water supply temperatures for the heat pump operation such as to provide maximum over-all efficiency.

Suitable packers for use in the hereindescribed wells may be made from such materials as "neoprene," rubber and canvas, or a combination of these or similar materials which will provide a cylindrical plug that can be carried by the well tubing and expanded when properly positioned in the well bore and which will establish an effective barrier between the upper and lower water sections.

Such packers are old and well known in the oil-well drilling art and may be any of several common constructions designed for such purpose and to suit various ground structures that might be encountered. One method of packer installation is to use a slip type of packer which is run on the pipe to the desired level and then expanded either by means of the weight of the tubing above the packer or by rotation of a screw coupling member at the top of the packer. It will be understood, however, that any suitable packer may be employed and that there is no intention to limit this invention to any particular type or construction of the packer.

The main advantages of our herein-described invention reside in the construction by which the maximum efficiency may be obtained from the use of the thermal capacity of well water in heat pump operation without depletion of the available earth water sources and without upset of the normal temperature and pressure conditions prevailing in the earth water sources.

Other advantages reside in the ability to use the improved system for either heating or cooling operation of the heat pump apparatus while obtaining maximum efficiency from the well water as a source of low level thermal energy and as a means for the dissipation of thermal energy from the heat pump apparatus. Still further advantages are to be found in the arrangement of the well structure whereby loss of heat from one temperature level to another in the well water is minimized through the insulated arrangement of the long leg of the well water circuit which receives or delivers water at the lower section of the well; and in the well arrangement whereby a packer is employed to physically separate water strata of different temperatures, or pressure conditions, or to divide a deep water stratum into upper and lower sections so as to minimize loss of temperature from one level to another.

Although several embodiments of this invention are herein shown and described, it will be understood that details of the constructions and arrangements shown may be altered or omitted without departing from the spirit of this invention as defined by the following claims.

We claim:

1. A water circulating system comprising a well bore extending into a subterranean water stratum and having upper and lower sections containing water of different temperatures, a water circuit leading from and returning to said well bore and including a conduit which extends into the lower of said sections and a second conduit which terminates in the upper of said sections, insulating means carried by and surrounding that portion of the first conduit passing through the upper of said sections, a pump, and means connecting said conduits and said pump arranged to take water through one conduit and return such water through the other conduit.

2. A water circulating system comprising a well bore extending into a subterranean water stratum and having upper and lower sections containing water of different temperatures, a water circuit leading from and returning to said well bore and including a conduit which extends into the lower of said sections and a second conduit which terminates in the upper of said sections, insulating means carried by and surrounding that portion of the first conduit passing through the upper of said sections, a pump, and means connecting said conduits and said pump arranged to take water through one conduit and return such water through the other conduit selectively.

3. A water circulating system comprising a well bore extending into a subterranean water stratum and having upper and lower sections containing water of different temperatures, a water circuit leading from and returning to said well bore and including a conduit which extends into the lower of said sections and a second conduit which terminates in the upper of said sections, a casing surrounding the first conduit in spaced relation, said casing extending through the upper section of said bore and being closed at its top, means to introduce air into said casing, a pump, and means connecting said conduits and said pump arranged to take water through one of said conduits and return water through the other conduit.

4. A water circulating system comprising a well bore extending into a subterranean water stratum and having upper and lower sections containing water of different temperatures, a water circuit leading from and returning to said well bore and including a conduit which extends into the lower of said sections and a second conduit which terminates in the upper of said sections, a casing surrounding the first conduit in spaced relation said casing extending through the upper section of said well and being closed at its top and bottom ends, means to introduce air into the upper portion of said casing, an outlet having a check valve therein at the lower portion of said casing, and means arranged to take water from said well bore through one of said conduits and return water through the other conduit.

5. In a well having a bore extending into a subterranean water stratum and having upper and lower sections containing water of different temperatures, a water conduit extending through said bore into the lower of said sections, a casing surrounding said conduit in spaced relation, said casing extending through the upper section of said bore and being closed at its upper and lower ends, means to introduce air under pressure into the upper portion of said casing, and an outlet having a check valve therein at the lower portion of said casing.

6. A water circulating system comprising a well bore extending through a subterranean water stratum and into a lower water stratum of different temperature than the first stratum, a packing disposed in said bore between said water strata and arranged to divide said bore into upper and lower sections, a water conduit extending into said bore and through said packing into the lower of said sections, means to insulate that portion of said conduit passing through the upper of said sections, a second conduit in said bore terminating in the upper bore section, and means arranged to take water through one conduit and return water through the other conduit.

7. In a heat pump, a refrigerant cycle including a heat exchanger, a subterranean heat exchanger comprising a vertically elongated well bore containing a heat conveying liquid, a pump and conduit system for circulating the heat conveying liquid between said heat exchangers, said system comprising a conduit extending downward for a substantial distance into the body of the heat conveying liquid in the upper part of said well bore, and a second conduit extending downward through the body of liquid in said well bore along the side of said first-named conduit, said second conduit being insulated from the other throughout that part of the well bore occupied by said first-named conduit and being open to the lower part of said well bore.

MARVIN M. SMITH.
EMORY N. KEMLER.

REFERENCES CITED

The following references are of record in the file of this patent:

UNITED STATES PATENTS

| Number | Name | Date |
|---|---|---|
| 1,482,376 | Anderson | Feb. 5, 1924 |
| 1,816,260 | Lee | July 28, 1931 |
| 1,957,624 | Warner | May 8, 1934 |
| 2,167,878 | Crawford | Aug. 1, 1939 |
| 2,214,064 | Niles | Sept. 10, 1940 |
| 2,401,890 | Smith | June 11, 1946 |